United States Patent
Chen et al.

(10) Patent No.: US 10,816,104 B2
(45) Date of Patent: Oct. 27, 2020

(54) SOLENOID VALVE FOR HYDRAULIC CONTROL DEVICE

(71) Applicant: NIDEC TOSOK CORPORATION, Kanagawa (JP)

(72) Inventors: Dongming Chen, Kanagawa (JP); Tomohiko Nakanishi, Kanagawa (JP); Koichi Ishikawa, Kanagawa (JP); Yoshikatsu Goto, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 23 days.

(21) Appl. No.: 16/137,505

(22) Filed: Sep. 20, 2018

(65) Prior Publication Data

US 2019/0085999 A1 Mar. 21, 2019

(30) Foreign Application Priority Data

Sep. 21, 2017 (JP) ................. 2017-180892

(51) Int. Cl.
| | |
|---|---|
| *F16K 31/06* | (2006.01) |
| *F02M 25/08* | (2006.01) |
| *F16K 1/36* | (2006.01) |
| *F16K 1/44* | (2006.01) |
| *B05B 1/30* | (2006.01) |

(52) U.S. Cl.
CPC ..... *F16K 31/0655* (2013.01); *F02M 25/0836* (2013.01); *F16K 1/36* (2013.01); *B05B 1/3053* (2013.01); *F16K 1/443* (2013.01)

(58) Field of Classification Search
CPC ........ F16K 31/0655; F16K 1/36; F16K 1/443; F16K 25/00; F16K 25/005; F02M 25/0836; B05B 1/3053

USPC .......... 251/129.02, 129.15–129.22, 332, 334
See application file for complete search history.

(56) References Cited

U.S. PATENT DOCUMENTS

| | | | | |
|---|---|---|---|---|
| 4,646,976 A | * | 3/1987 | Rembold | F02M 59/366 239/585.3 |
| 4,790,351 A | * | 12/1988 | Kervagoret | B60T 8/3635 137/596.17 |

(Continued)

FOREIGN PATENT DOCUMENTS

| | | |
|---|---|---|
| JP | H1047523 | 2/1998 |
| JP | 2012219868 | 11/2012 |

OTHER PUBLICATIONS

"Office Action of U.S. Appl. No. 16/136,288", dated Dec. 13, 2019, pp. 1-14.

*Primary Examiner* — John Bastianelli
(74) *Attorney, Agent, or Firm* — JCIPRNET

(57) ABSTRACT

A solenoid valve includes a solenoid portion that moves a pin to one axial side and a nozzle portion including a valve body connected to one axial side of the pin. The valve body is driven by the pin and moves to one axial side to close a valve hole and urged by a spring and moves to the other axial side to open the valve hole. The spring is disposed in an annular space between a radial outer surface of a second valve body portion and a radial inner surface of a valve chamber, one axial side of the spring is in contact with a bottom surface of the valve chamber, the other axial side is in contact with a first valve body portion extending radially from an outer surface of the second valve body portion, and the spring urges the valve body toward the other axial side.

11 Claims, 9 Drawing Sheets

(56) References Cited

U.S. PATENT DOCUMENTS

| | | | |
|---|---|---|---|
| 4,936,543 A * | 6/1990 | Kamibayasi | F16K 31/0658 251/129.15 |
| 5,010,923 A * | 4/1991 | Kouda | B60G 17/0155 137/625.34 |
| 5,135,027 A * | 8/1992 | Miki | F16K 31/0631 137/596.17 |
| 5,167,442 A | 12/1992 | Alaze et al. | |
| 5,423,602 A * | 6/1995 | Takahashi | B60T 8/363 251/129.19 |
| 5,556,175 A | 9/1996 | Hayakawa et al. | |
| 5,603,483 A * | 2/1997 | Reuter | B60T 8/363 251/129.02 |
| 6,120,003 A | 9/2000 | Lubischer et al. | |
| 6,148,841 A * | 11/2000 | Davidson | F16K 1/305 137/68.23 |
| 6,719,267 B2 | 4/2004 | Torii et al. | |
| 6,976,665 B2 * | 12/2005 | Seitz | B60T 8/363 251/129.02 |
| 7,832,707 B2 * | 11/2010 | Shigeta | B60T 8/363 251/129.02 |
| 7,871,056 B2 * | 1/2011 | Kratzer | B60T 8/363 251/129.02 |
| 7,938,381 B2 | 5/2011 | Takahashi et al. | |
| 8,550,427 B2 | 10/2013 | Yoshida et al. | |
| 2001/0050347 A1 | 12/2001 | Otsuka et al. | |
| 2009/0050829 A1 * | 2/2009 | Haynes | F16K 31/0606 251/129.02 |
| 2014/0217317 A1 * | 8/2014 | Ichihashi | F16K 31/06 251/129.02 |

\* cited by examiner

SOLENOID VALVE FOR HYDRAULIC CONTROL DEVICE

CROSS-REFERENCE TO RELATED APPLICATION

This application claims the priority of Japan patent application serial no. 2017-180892, filed on Sep. 21, 2017. The entirety of the above-mentioned patent application is hereby incorporated by reference herein and made a part of this specification.

BACKGROUND

The disclosure relates to a solenoid valve.

DESCRIPTION OF THE RELATED ART

Solenoid valves are widely used for opening and closing flow paths of fluids such as gas, water, and oil. For example, solenoid valves are used for control of hydraulic pressure to be supplied to a hydraulic control device of an automatic transmission of a vehicle or the like. Generally, a solenoid valve includes a nozzle having a valve body in a flow path of a fluid and a solenoid that opens and closes the flow path by driving the valve body.

Among solenoid valves are solenoid valves that use an urging force of a spring to open and close the valve. For example, there is a solenoid valve in which a spring is disposed between a fixed core and a movable core. As described in, for example, Japanese Unexamined Patent Application Publication No. 2012-219868, when the solenoid is not energized, as a result of the spring urging the movable core, a valve member of the solenoid valve is brought into contact with a valve seat by a shaft attached to the movable core and the valve is closed.

However, when the spring is used, a space for arranging the spring in the direction in which the valve body moves is required, which hinders size reduction of the solenoid valve.

The object of the disclosure is to reduce a size of a solenoid valve.

SUMMARY

A solenoid valve according to an exemplary first embodiment of the disclosure includes a solenoid portion that includes a pin that is movable in an axial direction and that moves the pin to one side in the axial direction by an attractive force generated by excitation, and a nozzle portion positioned on one side of the solenoid portion in the axial direction and having a valve body connected to one side of the pin in the axial direction. The nozzle portion includes a nozzle body that includes a valve chamber, which is recessed toward the one side thereof and opens on another side in the axial direction, and that houses the valve body in the valve chamber, a first port that is provided in the nozzle body and that communicates with a bottom surface of the valve chamber on the one side in the axial direction, a second port that is provided in the nozzle body and that communicates with an inner surface of the valve chamber in a radial direction, and a valve hole that is provided in the bottom surface of the valve chamber and that communicates with the first port, and a spring that is housed in the valve chamber and that urges the valve body toward the other side in the axial direction. When the solenoid portion is excited, the valve body is driven by the pin, moves to the one side in the axial direction, and closes the valve hole, and when the solenoid portion is not excited, the valve body is urged by the spring, moves to the other side in the axial direction, and opens the valve hole. The valve body includes a first valve body portion and a second valve body portion connected to each other in the axial direction. The first valve body portion is positioned on the other side of the second valve body portion in the axial direction and contacts the inner surface of the valve chamber in the radial direction. The second valve body portion has a smaller diameter than the first valve body portion. The spring is disposed in an annular space portion between an outer surface of the second valve body portion in the radial direction and the inner surface of the valve chamber in the radial direction, one side of the spring in the axial direction is in contact with the bottom surface of the valve chamber, the other side of the spring in the axial direction is in contact with the first valve body portion extending in the radial direction from the outer surface of the second valve body portion, and the spring urges the valve body toward the other side in the axial direction.

The above and other elements, features, steps, characteristics and advantages of the disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, an embodiment of a solenoid valve of the disclosure will be described with reference to the drawings. Further, the scope of the disclosure is not limited to the following embodiments and can be arbitrarily changed within the scope of the technical idea of the disclosure. In addition, in the following drawings, in order to make each configuration easy to understand, there are cases where actual scales, numbers and the like in the respective structures differ from the actual structures.

Figure 1:
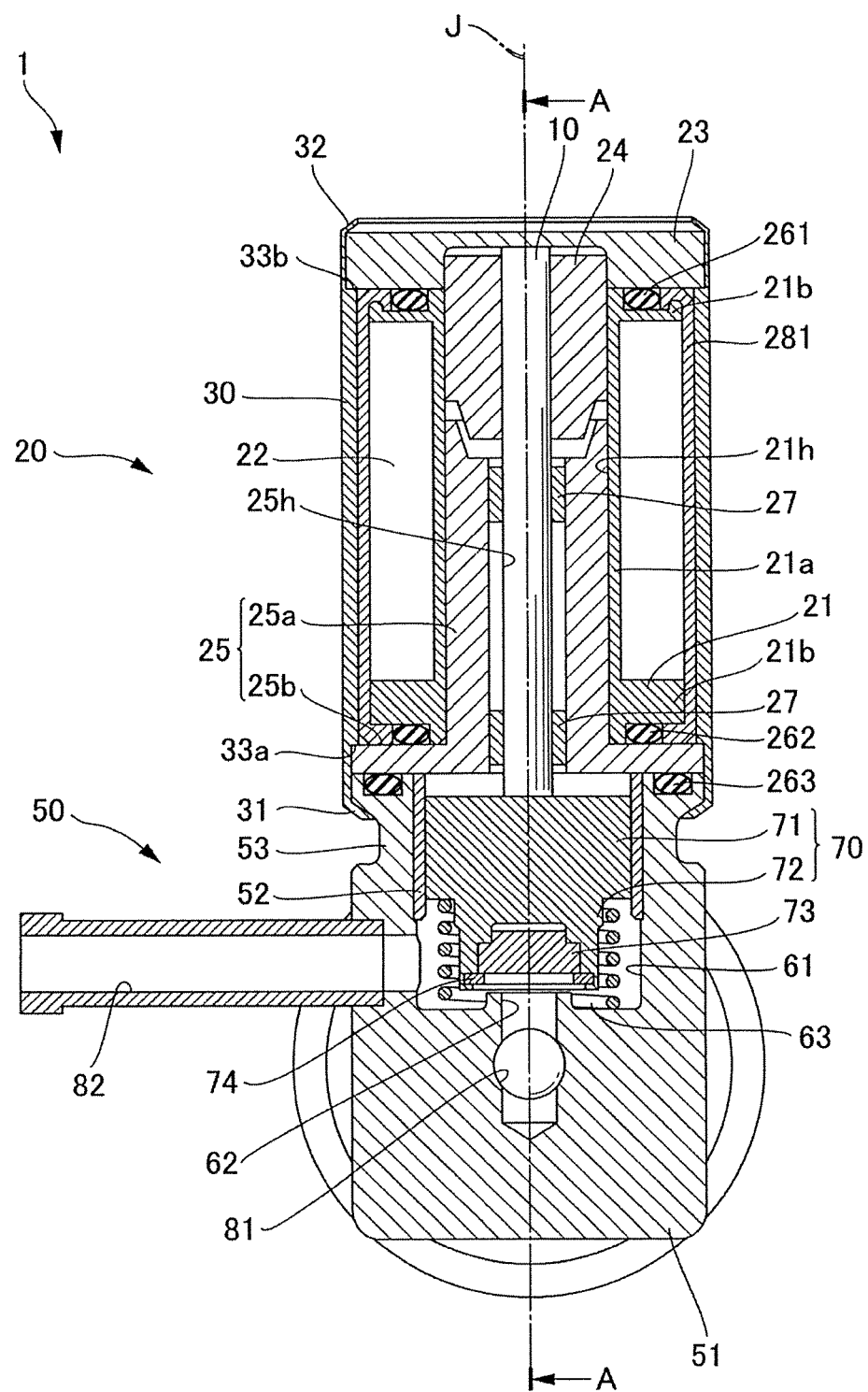
FIG. 1 is a sectional view illustrating a configuration when a solenoid valve according to an embodiment of the disclosure is in an open valve state.

In the following description, a direction parallel to a central axis J of a pin 10 illustrated in FIG. 1 is simply referred to as "axial direction", a radial direction with the central axis J as the center is simply referred to as "radial direction", and a circumferential direction with the central axis J as the center is simply referred to as "circumferential direction". In addition, along the central axis J, a lower side in the figures is referred to as "one side in the axial direction", and an upper side in the figures is referred to as "the other side in the axial direction".

Figure 2:
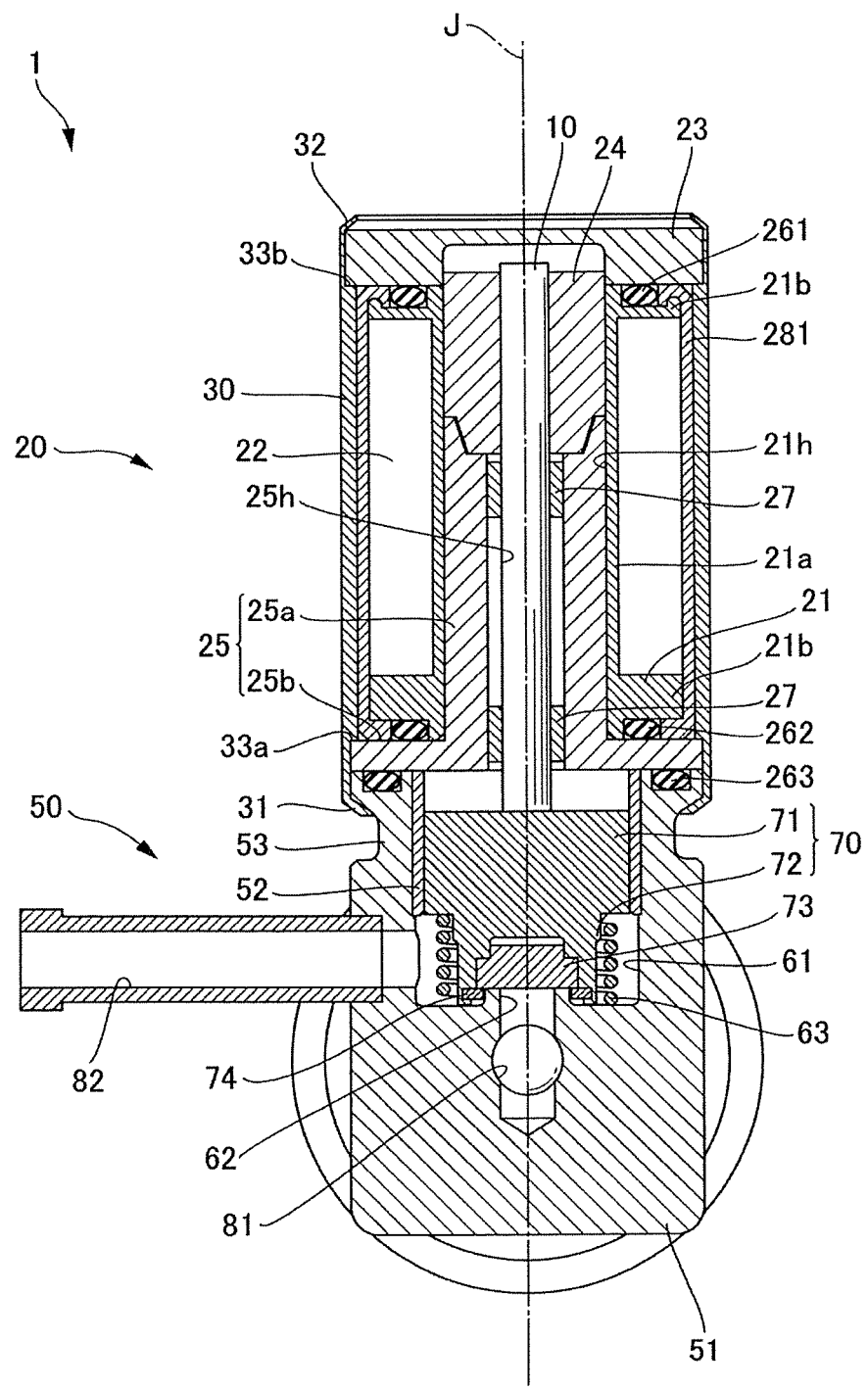
FIG. 2 is a sectional view illustrating a configuration when the solenoid valve of FIG. 1 is in a closed valve state.
Figure 3:
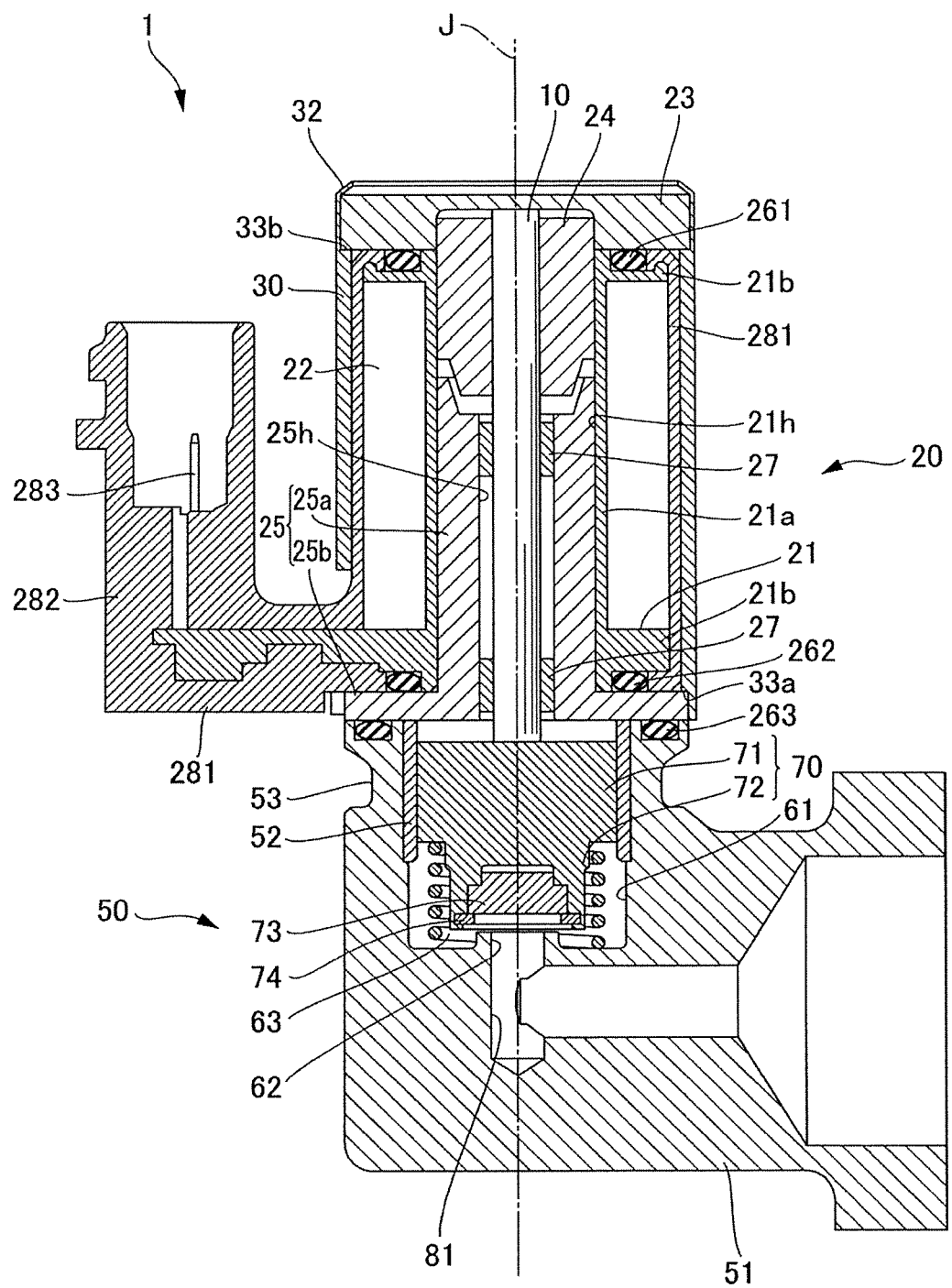
FIG. 3 is a sectional view taken along the line A-A of the solenoid valve of FIG. 1.
Figure 4:
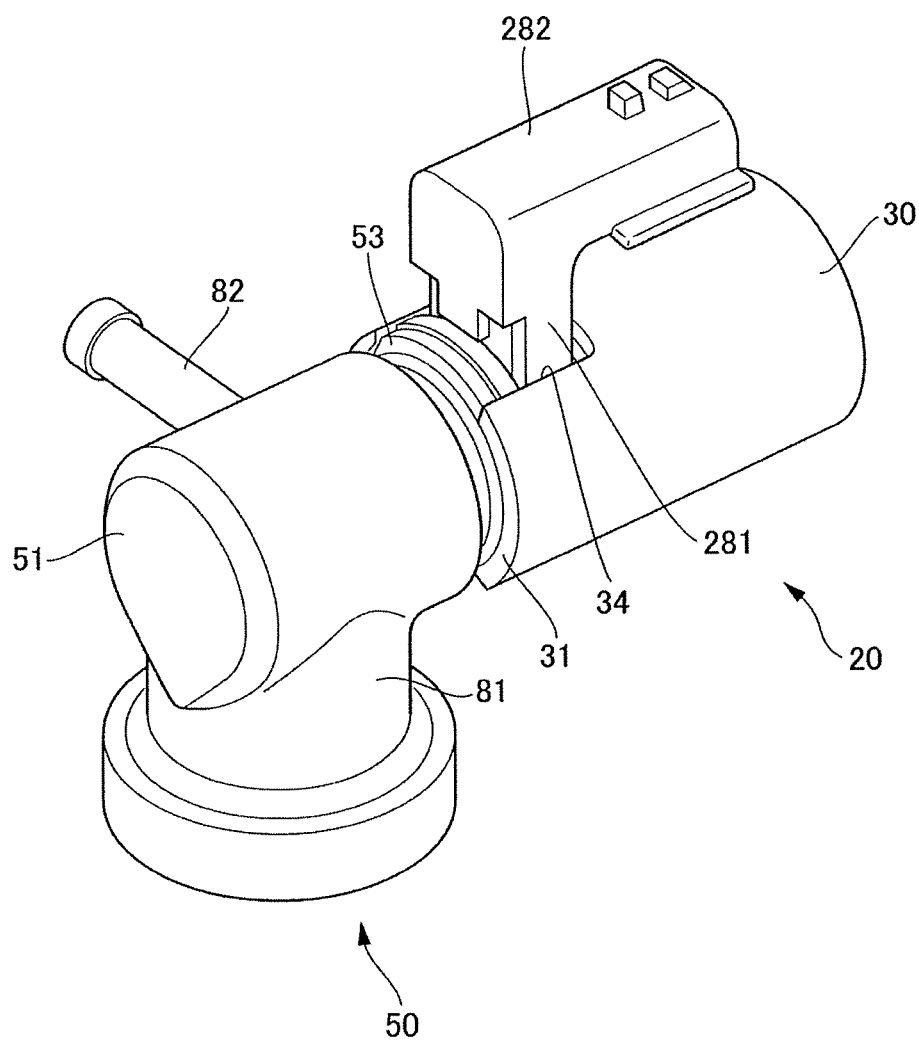
FIG. 4 is a perspective view of the solenoid valve of FIG. 1.

FIG. 1 and FIG. 2 are cross-sectional views of a solenoid valve 1 according to an embodiment of the disclosure. FIG. 1 illustrates an open valve state and FIG. 2 illustrates a closed valve state. FIG. 3 is a cross-sectional view of the solenoid valve 1 taken along line A-A. FIG. 4 is a perspective view of the solenoid valve 1.

As illustrated in FIG. 1 to FIG. 4, the solenoid valve 1 includes a solenoid portion 20 and a nozzle portion 50.

The solenoid portion 20 includes the pin 10, which is movable in the axial direction, and moves the pin 10 to one side in the axial direction by an attractive force generated by excitation. The nozzle portion 50 is positioned on one side of the solenoid portion 20 in the axial direction.

Nozzle Portion

The nozzle portion 50 includes a nozzle body 51, a first port 81, a second port 82, a valve hole 62, a spring 63, and a valve body 70.

The nozzle body 51 includes a valve chamber 61, which is recessed to one side and opens on the other side in the axial direction. The nozzle body 51 houses the valve body 70 in the valve chamber 61. The nozzle body 51 includes a guide 52 for the valve body 70 on an inner surface of the valve chamber 61. The guide 52 is a cylindrical non-magnetic body extending along the axial direction.

In the present embodiment, the nozzle body 51 includes a groove 53 along the circumferential surface thereof on the other side in the axial direction. The nozzle body 51 can be made of a magnetic metal or a resin. The metal may be a magnetic metal such as iron or a nonmagnetic metal such as aluminum.

The nozzle body 51 is provided with the first port 81 and the second port 82. The first port 81 communicates with a bottom surface of the valve chamber 61 on one side in the axial direction. The second port 82 communicates with the inner surface of the valve chamber 61 in the radial direction. In the present embodiment, the first port 81 is an in-port into which a fluid flows. The second port 82 is an out-port through which the fluid flowing in from the in-port flows out.

The valve hole 62 is provided in the bottom surface of the valve chamber 61 and communicates with the first port 81. A peripheral edge portion of the valve hole 62 protrudes in a cylindrical shape toward the other side in the axial direction.

Valve Body

The valve body 70 has, for example, a columnar shape with the central axis J as the center. The valve body 70 is connected to one side of the pin 10 in the axial direction. In the present embodiment, the valve body 70 and the pin 10 are separate members and the valve body 70 is pressed against the pin 10 by an urging force of the spring 63 in such a manner that the pin 10 and the valve body 70 are connected to each other. The connection between the pin 10 and the valve body 70 is not limited to this, and it is also possible to connect the pin 10 and the valve body 70 to each other by connecting the valve body 70 and the pin 10 integrally by press-fitting the pin 10 into a hole of the valve body 70.

When the solenoid portion 20 is excited, the valve body 70 is driven by the pin 10 and moves to one side in the axial direction, contacts the valve hole 62, and closes the valve hole 62. In addition, when the solenoid portion 20 is not excited, the valve body 70 is urged by the spring 63 and moves to the other side in the axial direction, separates from the valve hole 62, and opens the valve hole 62.

The valve body 70 includes a first valve body portion 71 and a second valve body portion 72 connected to each other in the axial direction. The first valve body portion 71 is positioned on the other side of the second valve body portion 72 in the axial direction. The second valve body portion 72 has a smaller diameter than the first valve body portion 71.

The first valve body portion 71 contacts the inner surface of the valve chamber 61 in the radial direction. In the present embodiment, the first valve body portion 71 contacts the guide 52 on the inner surface of the valve chamber 61 and moves along the inner surface of the guide 52 within the range of the guide 52 when opening and closing the valve hole 62. A contact resistance with the first valve body portion 71 can be reduced by the guide 52. Therefore, it becomes less necessary to strictly control the machining accuracy of the inner surface of the valve chamber 61 in the radial direction, which facilitates machining.

Spring

The spring 63 is housed in the valve chamber 61. More specifically, the spring 63 is disposed in an annular space between an outer surface of the second valve body portion 72 in the radial direction and the inner surface of the valve chamber 61 in the radial direction. Because a dedicated arrangement space for the spring 63 is unnecessary in the axial direction, the solenoid valve 1 can be reduced in size. In addition, because the outer surface of the second valve body portion 72 and the inner surface of the valve chamber 61 serve as guides when the spring 63 expands and contracts, the spring 63 can smoothly expand and contract. One side of the spring 63 in the axial direction contacts the bottom surface of the valve chamber 61. The other side of the spring 63 in the axial direction contacts the first valve body portion 71, which extends in the radial direction from the outer surface of the second valve body portion 72, and urges the valve body 70 to the other side in the axial direction.

Figure 5:
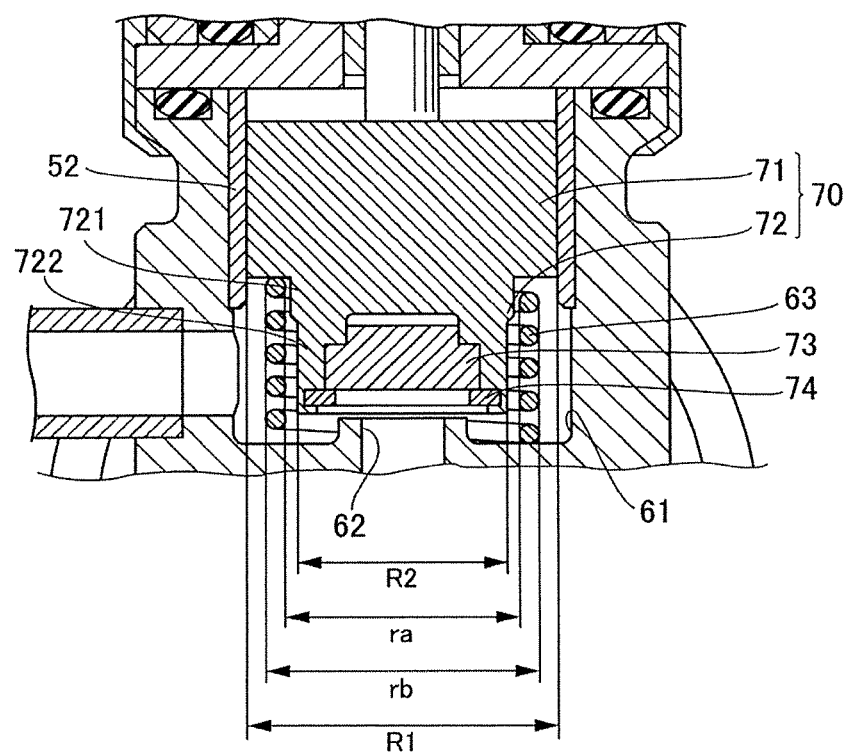
FIG. 5 is an enlarged view of a periphery of a valve body.

FIG. 5 is an enlarged view of the periphery of the valve body 70.

As illustrated in FIG. 5, an inner diameter ra of the spring 63 is larger than an outer diameter R2 of the second valve body portion 72 and smaller than an outer diameter rb of the spring 63. The outer diameter rb of the spring 63 is smaller than an outer diameter R1 of the first valve body portion 71. A difference (R1−R2) between the outer diameter R1 of the first valve body portion 71 and the outer diameter R2 of the second valve body portion 72 is twice a cross-sectional diameter of the spring 63, that is, greater than (rb−ra). A difference (R1−rb) between the outer diameter R1 of the first valve body portion 71 and the outer diameter rb of the spring 63 is larger than a difference (ra−R2) between the inner diameter ra of the spring 63 and the outer diameter R2 of the second valve body portion 72.

As described above, an annular space portion from the outer surface of the second valve body portion 72 to the inner surface of the first valve body portion 71 is larger than a cross-sectional diameter of the spring 63 and is sufficiently wide. In addition, a distance from the spring 63 to the second valve body portion 72 is shorter than a distance from the spring 63 to the first valve body portion 71 and the spring 63 is closer to the second valve body portion 72 than the first valve body portion 71. Therefore, it is possible to prevent the spring 63 from interfering with the inner surface of the valve chamber 61 or the guide 52 during expansion and contraction.

One side of the second valve body portion 72 in the axial direction has a smaller diameter than the other side. When arranging the spring 63 around the outer surface of the second valve body portion 72, because the one side of the second valve body portion 72 in the axial direction into which the spring 63 is inserted has a small diameter, an insertion of the spring 63 is facilitated. In addition, because it is difficult for the spring 63 and the outer surface of the second valve body portion 72 to come into contact with each other, it is possible to prevent the spring 63 and the surface of the valve body 70 from peeling and mixing a foreign matter as a result of contact.

As illustrated in FIG. 5, the second valve body portion 72 of the present embodiment includes two valve body portions 721 and 722 having different diameters. The valve body portion 721 has a smaller diameter than the first valve body portion 71. The valve body portion 722 is positioned on one side of the valve body portion 721 in the axial direction and has a smaller diameter than the valve body portion 721. As long as one side of the second valve body portion 72 is smaller in diameter than the other side, the second valve body portion 72 may have a tapered shape with a smaller diameter toward one side in the axial direction.

The second valve body portion 72 includes an elastic body portion 73 and a retaining ring 74 on an end surface thereof on one side in the axial direction. The elastic body portion 73 is a disc-shaped nonmagnetic material having a larger diameter than the valve hole 62 and has a projecting portion on the other side thereof in the axial direction. On the end surface of the second valve body portion 72 on one side in the axial direction, a recessed portion recessed toward the other side in the axial direction is provided, and the elastic body portion 73 is arranged in this recessed portion. A groove is provided on the inner surface of the recessed portion in the radial direction, and the retaining ring 74 is disposed in the groove so as to contact a peripheral edge of the elastic body portion 73 and press the elastic body portion 73 so as not to come off the recessed portion. The retaining ring 74 is an annular or C-shaped elastic body.

When the valve body 70 closes the valve hole 62, as illustrated in FIG. 2, the elastic body portion 73 of the second valve body portion 72 comes into contact with the valve hole 62, more specifically, a projecting peripheral edge portion of the valve hole 62. When the valve body 70 opens the valve hole 62, the elastic body portion 73 of the second valve body portion 72 separates from the valve hole 62, more specifically, the projecting peripheral edge portion of the valve hole 62.

As a result of the peripheral edge portion of the valve hole 62 protruding, the valve body 70 can strongly contact the valve hole 62. The adhesion between the valve body 70 and the valve hole 62 is improved and leakage of fluid from a vicinity of the valve hole 62 can be suppressed.

Solenoid Portion

The solenoid portion 20 includes the pin 10, a bobbin 21, a coil 22, a yoke 23, a plunger 24, a core 25, a bearing portion 27, and seal members 261 and 262. In addition, the solenoid portion 20 includes a solenoid housing portion 30, a mold 281, and a connector 282.

Bobbin

The bobbin 21 has a cylindrical shape along the axial direction and includes a first through hole 21h in the axial direction. In the present embodiment, the bobbin 21, which is cylindrical, includes a cylindrical portion 21a and two flange portions 21b. The two flange portions 21b respectively extend in the radial direction on one side and the other side of the cylindrical portion 21a in the axial direction.

Coil

The coil 22 is wound around a circumferential surface of the bobbin 21. The coil 22 excites the core 25 when energized.

Yoke

The yoke 23 is a magnetic body arranged on the other side of the bobbin 21 in the axial direction. In the present embodiment, the yoke 23 is in the form of a disc, and is disposed on the other side of the bobbin 21 and the plunger 24 in the axial direction. An outer surface of the yoke 23 in the radial direction is in contact with the inner surface of the solenoid housing portion 30 and closes an opening portion on the other side of the solenoid housing portion 30 in the axial direction. The yoke 23 includes a recessed portion concentric with the central axis J on one side in the axial direction.

The seal member 261 is disposed between the bobbin 21 and the yoke 23, more specifically, between the flange portion 21b of the bobbin 21 and the yoke 23, which faces the flange portion 21b. In the present embodiment, the seal member 261 is an O-ring formed of an elastic body such as rubber. An adhesion between the bobbin 21 and the yoke 23 can be enhanced by the seal member 261 and leakage of fluid from the boundary between the bobbin 21 and the yoke 23 to an outside of the solenoid valve 1 can be suppressed.

Plunger

The plunger 24 is arranged on the other side of the core 25 in the axial direction on an inner side of the first through hole 21h of the bobbin 21 in the radial direction. In the present embodiment, the plunger 24 has a cylindrical shape concentric with the central axis J. An outer surface of the plunger 24 in the radial direction on the other side of the plunger 24 in the axial direction is in contact with an inner surface of a recessed portion of the yoke 23 in the radial direction. The plunger 24 includes a through hole along the central axis J and the plunger 24 is fixed to the other side of the pin 10 in the axial direction by press-fitting the pin 10 into the through hole.

The plunger 24 is a magnetic body and moves to one side in the axial direction by the attractive force generated by the excitation of the core 25. When the core 25 is not excited, the plunger 24, along with the valve body 70 and the pin 10, which are urged by the spring 63 and move to the other side in the axial direction, moves to the other side in the axial direction. The plunger 24 is guided by the inner surface of the recessed portion of the yoke 23 and moves in the axial direction.

Core

The core 25 is disposed on one side of the plunger 24 in the axial direction on the inner side of the first through hole 21h of the bobbin 21 in the radial direction. The core 25 is a cylindrical magnetic body that includes a second through hole 25h in the axial direction. The core 25 includes a cylindrical portion 25a and a flange portion 25b. The flange portion 25b extends in the radial direction on one side of the cylindrical portion 25a in the axial direction. The bobbin 21 is disposed between the flange portion 25b of the core 25 and the yoke 23 in the axial direction.

The seal member 262 is disposed between the core 25 and the bobbin 21, more specifically, between the flange portion 25b of the core 25 and the flange portion 21b of the bobbin 21. In the present embodiment, the seal member 262 is an O-ring made of an elastic body such as rubber. An adhesion between the core 25 and the bobbin 21 can be enhanced by the seal member 262 and leakage of fluid from the boundary between the core 25 and the bobbin 21 to the outside of the solenoid valve 1 can be suppressed.

Pin

The pin 10 has, for example, a columnar shape extending in the axial direction. In the present embodiment, the pin 10 is arranged along the central axis J in the second through hole 25h of the core 25. The other side of the pin 10 in the axial direction is fixed to the plunger 24 and one side in the axial direction is connected to the valve body 70.

The bearing portion 27 of the pin 10 is provided on the inner side of the second through hole 25h of the core 25 in the radial direction. Both ends of the bearing portion 27 in the axial direction are open and the bearing portion 27 has a cylindrical shape with the central axis J as the center. The bearing portion 27 supports the pin 10 inserted therein so as to enable the pin 10 to be movable in the axial direction.

Solenoid Housing Portion

The solenoid housing portion 30 is a cylindrical case having opening portions on one side and the other side in the axial direction. The solenoid housing portion 30 is, for example, a cylindrical shape concentric with the central axis J, and surrounds the outer sides of the bobbin 21, the coil 22, the yoke 23, the plunger 24 and the core 25 in the radial direction. The solenoid housing portion 30 is made of a magnetic material such as a metal.

The solenoid housing portion 30 includes a crimp portion 31 on a periphery of an opening portion on one side in the axial direction. The crimp portion 31 contacts an outer periphery of the nozzle body 51. In this embodiment, the crimp portion 31 contacts the groove 53 provided on the outer periphery of the nozzle body 51 and the solenoid housing portion 30 is fixed to the nozzle body 51. The crimp portion 31 allows the solenoid housing portion 30 to be fixed in close contact with the nozzle body 51. In addition, because the crimp portion 31 is locked by the groove 53, the solenoid housing portion 30 can be firmly brought into close contact with the nozzle body 51 and fixed. It is possible to effectively suppress leakage of the fluid in the valve chamber 61 from a boundary between the solenoid portion 20 and the nozzle portion 50 to the outside of the solenoid valve 1.

In addition, the solenoid housing portion 30 includes a crimp portion 32 on a periphery of an opening portion on the other side in the axial direction. The crimp portion 32 contacts an outer peripheral edge of the yoke 23 on the other side in the axial direction and the yoke 23 is fixed inside the solenoid housing portion 30. The crimp portion 32 allows the yoke 23 to be brought into close contact with the solenoid housing portion 30.

The solenoid valve 1 includes a seal member 263 between the solenoid portion 20 and the nozzle portion 50. In the present embodiment, the seal member 263 is an O-ring composed of an elastic material such as rubber. An annular groove is provided on an end surface of the nozzle body 51 on the other side in the axial direction in contact with the flange portion 25b of the core 25 and the seal member 263 is disposed in the groove. An adhesion between the solenoid portion 20 and the nozzle portion 50 can be improved by the seal member 263 and leakage of fluid from the boundary between the solenoid portion 20 and the nozzle portion 50 to the outside of the solenoid valve 1 can be suppressed.

In order to enable insertion of the solenoid member from the opening portion, the inner diameter of the solenoid housing portion 30 is larger on one side and the other side in the axial direction and the solenoid housing portion 30 is provided with stepped portions 33a and 33b on an inner peripheral surface thereof on one side and the other side in the axial direction, respectively. By fitting the flange portion 25b of the core 25 between the crimp portion 31 on one side of the solenoid housing portion 30 in the axial direction and the stepped portion 33a, the position of the core 25 is established inside the solenoid housing portion 30. In addition, by fitting the yoke 23 between the crimp portion 32 of the solenoid housing portion 30 and the stepped portion 33b, the position of the yoke 23 is established inside the solenoid housing portion 30.

Mold and Connector

The mold 281 covers the bobbin 21 and the coil 22 inside the solenoid housing portion 30. As illustrated in FIG. 3 and FIG. 4, a portion of the mold 281 protrudes from a cutout portion 34 of the solenoid housing portion 30 to the outer side of the solenoid housing portion 30 in the radial direction. The cutout portion 34 is provided on one side of the solenoid housing portion 30 in the axial direction.

As illustrated in FIG. 3 and FIG. 4, the connector 282 is provided in a portion of the mold 281 that protrudes from the solenoid housing portion 30. The connector 282 includes a connection terminal 283. The connection terminal 283 is electrically connected to the coil 22 and supplies a current from an external power supply (not illustrated) to the coil 22.

Operation of Solenoid Valve

The solenoid valve 1 is a normally open solenoid valve that closes the valve only when the solenoid portion 20 is excited.

When the solenoid portion 20 is in a non-excited state, as illustrated in FIG. 1, the valve body 70 is urged and moved toward the other side in the axial direction by an elastic force of the spring 63 and an open valve state is maintained in which the valve hole 62 is open. The first port 81 communicates with the second port 82 via the valve chamber 61, and the fluid flowing into the valve chamber 61 from the first port 81 via the valve hole 62 flows out to the second port 82.

In the open valve state, when the coil 22 is energized, the core 25, which is excited, attracts the plunger 24 to one side in the axial direction, and the pin 10, which is fixed to the plunger 24, urges the valve body 70 to one side in the axial direction. Although the valve body 70 is urged to the other side in the axial direction by the spring 63, the attractive force of the core 25 greatly exceeds the elastic force of the spring 63. Therefore, as illustrated in FIG. 2, the pin 10 presses the valve body 70 against the valve hole 62 against the urging force of the spring 63. As a result, the valve hole 62 is closed and the flow path between the first port 81 and the second port 82 is interrupted. While the coil 22 is energized, a closed valve state in which the valve hole 62 is closed is maintained.

In the closed valve state, when the energization of the coil 22 is interrupted, because the attractive force of the core 25 is lost, as illustrated in FIG. 1, the valve body 70, the pin 10 and the plunger 24 move to the other side in the axial direction by the elastic force of the spring 63. When the valve body 70 is separated from the valve hole 62 and the valve hole 62 is opened, the fluid flows out from the first port 81 via the valve hole 62 and flows out to the second port 82 via the valve chamber 61.

As described above, in the solenoid valve 1 of the present embodiment, because the valve body 70 includes the first valve body portion 71 and the second valve body portion 72 having a smaller diameter than the first valve body portion 71, a space portion can be provided around the second valve body portion 72 in the valve chamber 61. By disposing the spring 63 in this space portion, the space occupied by the spring 63 can be reduced and the solenoid valve 1 can be reduced in size. Because the valve body 70 is configured to close the valve hole 62 at a time of excitation, it is possible to provide the solenoid valve 1, which is compact, as a normally open type solenoid valve.

In the solenoid valve 1 of the present embodiment, the core 25 housed in the solenoid housing portion 30 is brought into close contact with the nozzle body 51 by the crimp portion 31, and the yoke 23 is brought into close contact with the stepped portion 33b by the crimp portion 32. In addition, the seal members 261 to 263 are disposed between the members of the solenoid portion 20 and between the solenoid portion 20 and the nozzle portion 50. Therefore, it is possible to provide the solenoid valve 1 with less leakage of fluid to the outside.

Abnormality Diagnosis Device

Because the solenoid valve 1 can be reduced in size and there is little leakage of fluid from the solenoid valve 1, it can be optimally used for an abnormality diagnosis device in a blow-by gas returning device. The blow-by gas returning device is a device that returns blow-by gas, which has leaked from a combustion chamber of an engine to a crankcase, to an intake pipe of an engine. The abnormality diagnosis device diagnoses an abnormality in a return flow path for returning blow-by gas, that is, a presence or an absence of leakage of blow-by gas.

First Embodiment

Figure 6:
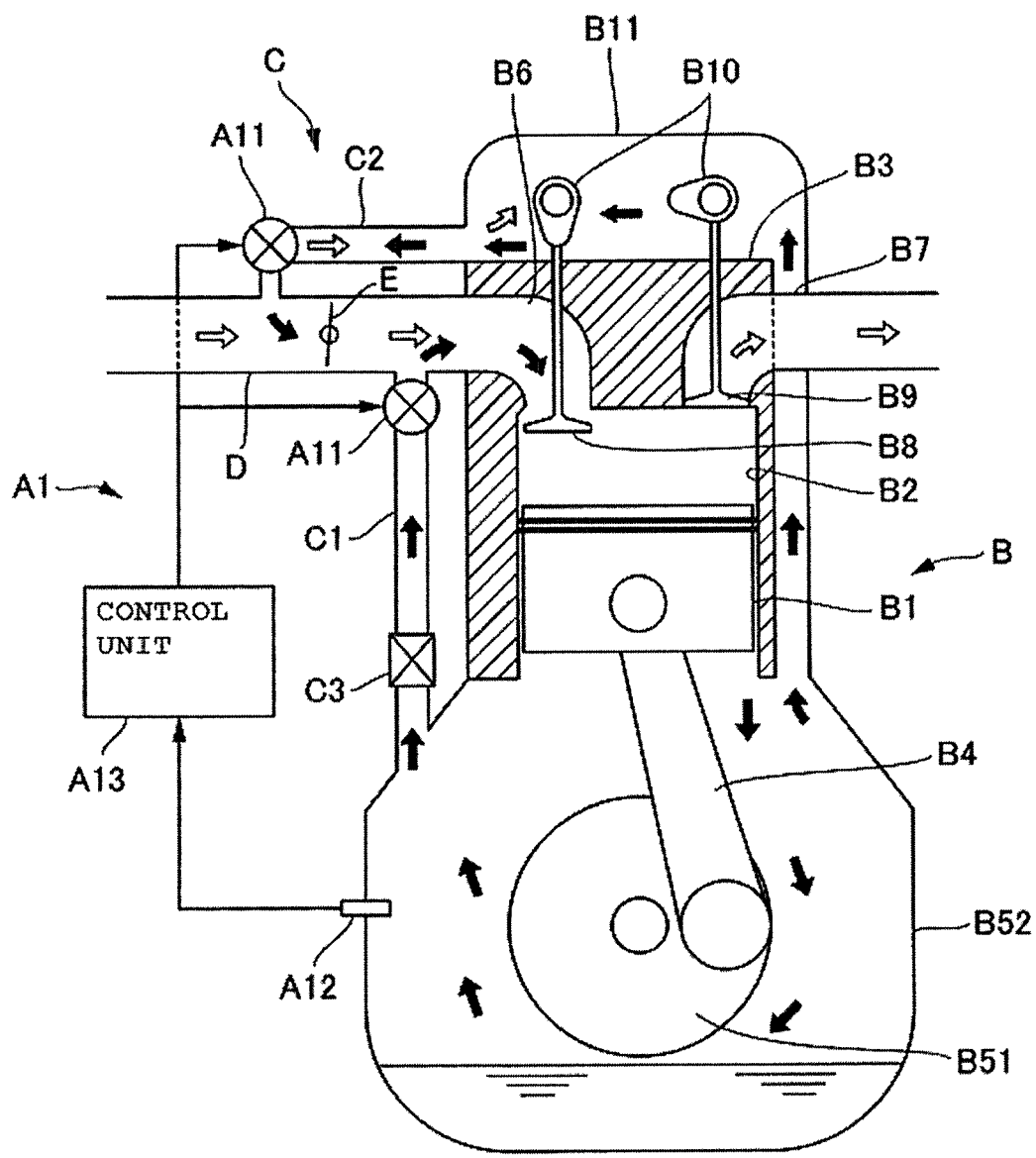
FIG. 6 is a diagram illustrating a configuration of an abnormality diagnosis apparatus of a first embodiment.

FIG. 6 is a diagram illustrating a configuration of an abnormality diagnosis apparatus A1 of the first embodiment.

An abnormality diagnosis device A1 detects an abnormality in the blow-by gas returning device C. The blow-by gas returning device C is provided in an engine B and returns a blow-by gas generated in the engine B to an intake pipe D.

Engine

The engine B includes a piston B1, a combustion chamber B2, a cylinder B3, a connecting rod B4, a crankshaft B51, a crankcase B52, an intake port B6, an exhaust port B7, an intake valve B8, an exhaust valve B9, a valve operating mechanism B10 and a cylinder head B11. The intake port B6 is connected to the intake pipe D.

The piston B1 is housed in the cylinder B3. A connecting rod B4 is connected to the piston B1. The connecting rod B4 and the crankshaft B51 are housed in the crankcase B52. The crankshaft B51 is connected to the connecting rod B4 and converts a reciprocating motion of the piston B1 into a rotational motion. In addition to the valve operating mechanism B10, an ignition device, an injector and the like (not illustrated) are housed in the cylinder head B11 at an upper portion of the cylinder B3.

In the combustion chamber B2 above the piston B1, air sucked through the intake pipe D flows from the intake port B6 in accordance with a stroke of the piston B1. An exhaust gas, after burning in the combustion chamber B2, is discharged from the exhaust port B7. The valve operating mechanism B10 opens and closes the intake valve B8 and the exhaust valve B9 at a timing of intake and exhaust in conjunction with a movement of the connecting rod B4.

Blow-by Gas Returning Device

The blow-by gas returning device C returns to the intake pipe D blow-by gas that has leaked out from the combustion chamber B2 of the engine B through the gap between the cylinder B3 and the piston B1 to the crankcase B52.

The blow-by gas returning device C includes two return flow paths C1 and C2 and a positive crankcase ventilation (PCV) valve C3.

The return flow path C1 is a flow path direct from the crankcase B52 to the intake pipe D. A PCV valve C3 is provided on the crankcase B52 side of the return flow path C1. The PCV valve C3 adjusts a flow rate of the blow-by gas to be returned to the return flow path C1. The return flow path C2 is a flow path of the blow-by gas from the crankcase B52 to the intake pipe D via an internal space of the cylinder head B11. The return flow paths C1 and C2 are constituted by gas pipes or the like.

A throttle valve E is provided in the intake pipe D. The throttle valve E mixes the blow-by gas returned to the intake pipe D from the return passages C1 and C2 with air introduced into the intake pipe D. The return flow path C2 is also a flow path for introducing air to the cylinder head B11, and the air introduced into the intake pipe D flows from the return flow path C2 to the cylinder head B11.

Abnormality Diagnosis Device

The abnormality diagnosis device A1 includes two solenoid valves A11, a pressure sensor A12, and a control unit A13.

The two solenoid valves A11 are provided in the return flow passages C1 and C2, respectively. Each of the solenoid valves A11 opens and closes a flow path from each of the return flow paths C1 and C2 to the intake pipe D with the return flow paths C1 and C2 serving as in-ports and the intake pipe D serving as an out-port. By opening the PCV valve C3 and closing the two solenoid valves A11, among the flow paths of the blow-by gas from the engine B to the intake pipe D, an interior space interposed between the two closed solenoid valves A11 can be a closed space. In the present embodiment, internal spaces of the return flow paths C1 and C2, the crankcase B52 and the cylinder head B11 between the solenoid valves A11 can be a closed space.

The pressure sensor A12 detects the pressure in the closed space when each of the solenoid valves A11 is closed.

The control unit A13 closes the two solenoid valves A11 at the time of abnormality diagnosis. When an amount of change in pressure of the closed space detected by the pressure sensor A12 exceeds a threshold value, the control unit A13 diagnoses it as an abnormality. A processing content of the control unit A13 can be realized by software processing in which a program describing a processing procedure is read and executed by a computer from a storage medium that stores the program. As the computer, for example, an engine control unit (ECU) or the like can be used. As the storage medium, a hard disk, read only memory (ROM), or the like can be used.

Figure 7:
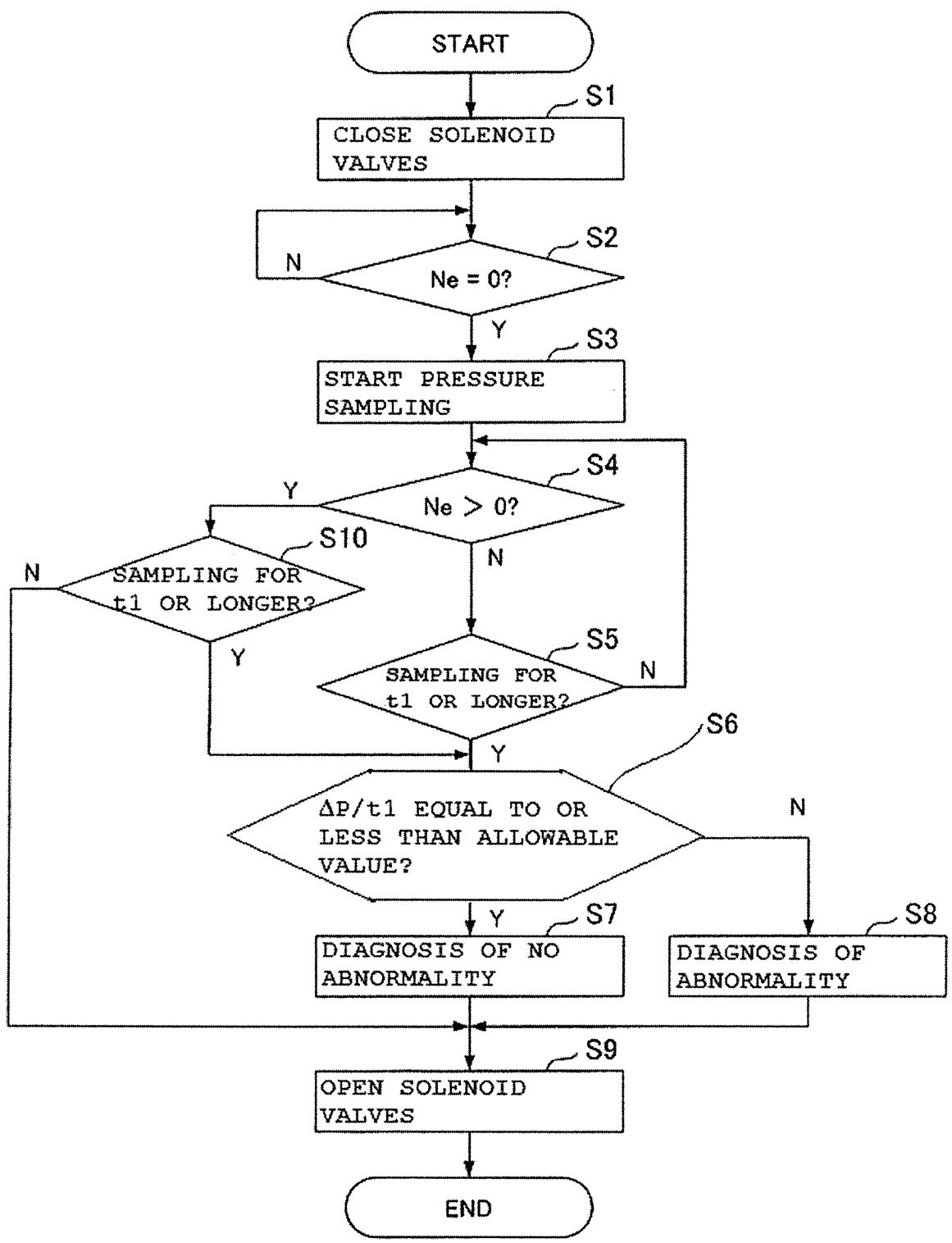
FIG. 7 is a flowchart illustrating a processing procedure for diagnosing a presence or an absence of an abnormality in an abnormality diagnosis apparatus.

FIG. 7 is a flowchart illustrating a processing procedure for diagnosing a presence or an absence of an abnormality in the abnormality diagnosis apparatus A1. This processing procedure is started when an instruction to stop a rotation of the engine B is outputted from a control device of a vehicle.

In the abnormality diagnosis apparatus A1, as illustrated in FIG. 7, the control unit A13 closes the two solenoid valves A11 (step S1). In addition, the control unit A13 starts sampling the pressure with the pressure sensor A12 (step S3) after a rotation speed Ne of the engine B becomes Ne=O and the rotation has stopped (step S2:Y).

After starting the sampling, the control unit A13 judges whether or not the rotation speed Ne of the engine B becomes Ne>0 and whether or not the engine B has started to rotate (step S4). In the case where Ne>0 is not true (step S4:N), if the sampling has been performed for a predetermined time t1 or longer (Y in step S5), the control unit A13 calculates an amount of change in pressure detected by the pressure sensor A12 over the fixed time t1 (ΔP/t1). When the sampling time is shorter than the predetermined time t1 (step S5:N), the process returns to step S4 and the sampling is continued.

When the calculated amount of change in pressure ΔP/t1 is equal to or less than an allowable value (step S6:Y), the control unit A13 diagnoses that there is no abnormality (step S7). On the other hand, when the calculated amount of change in pressure ΔP/t1 exceeds the allowable value (step S6:N), the control unit A13 diagnoses that there is an abnormality (step S8). After the diagnosis, the control unit A13 opens the two solenoid valves A11 (step S9).

Figure 8:
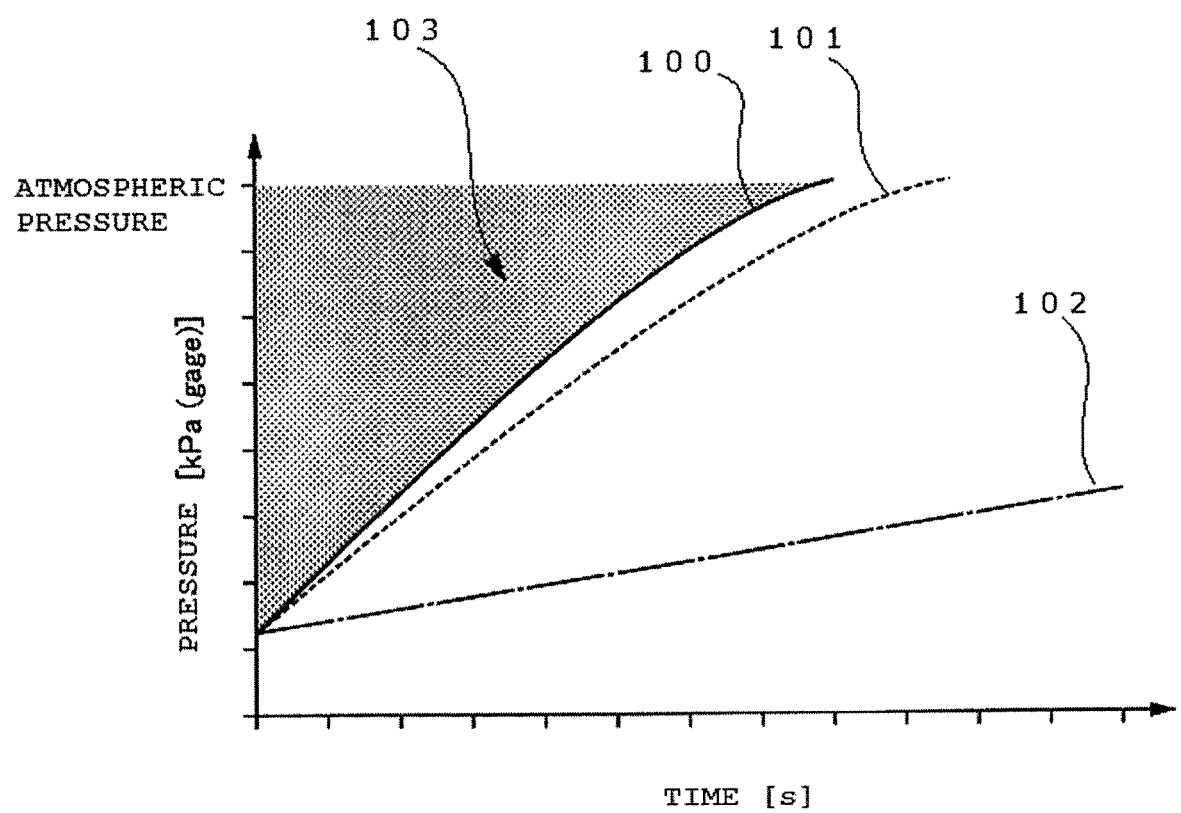
FIG. 8 is a graph illustrating a change in pressure in a closed space.

FIG. 8 is a graph illustrating the change in pressure in the closed space. The numeral 100 indicates an allowable pressure change that is a combination of a gas leak and a gas leak of the solenoid valve, the numeral 101 indicates an allowable pressure change of a gas leak, the numeral 102 indicates a pressure change due to a gas leak of the solenoid valve, the numeral 103 indicates a range to be diagnosed as abnormal.

As illustrated in FIG. 8, a range exceeding a pressure change that is a combination of a pressure change in the closed space at the time when a gas leak occurs and a pressure change in the closed space when there is a gas leak in the solenoid valve A11 is a range that is diagnosed as abnormal.

As illustrated in FIG. 8, the larger the gas leak in the solenoid valve A11, the smaller the diagnostic range, and the larger an error for a gas leak which should be diagnosed as essentially abnormal. Therefore, by using the solenoid valve 1 of the present embodiment, which has little gas leakage, as the solenoid valve A11 of the abnormality diagnosis apparatus A1, it is possible to improve abnormality diagnosis accuracy.

On the other hand, in the case where the number of revolutions Ne of the engine B is Ne>0 (step S4:Y) and sampling is performed for the predetermined time t1 or longer (step S10:Y), the process proceeds to step S6 and an abnormality diagnosis is performed by using the sampled pressure.

In the case where the rotation speed Ne of the engine B is Ne>0 (step S4:Y) and sampling has not been performed for a predetermined time t1 or longer (step S10:N), diagnosis is stopped and each solenoid valve A11 is opened (Step S9).

As described above, the abnormality diagnosis apparatus A1 of the first embodiment includes the two solenoid valves A11 provided in the two return flow paths C1 and C2, respectively, for returning blow-by gas generated in the engine B to the intake pipe D of the engine B, the control unit A13 which closes the two solenoid valves A11 at the time of abnormality diagnosis of the return flow paths C1 and C2, and the pressure sensor A12 that detects a pressure in the closed space interposed by the two solenoid valves A11, which are closed, among the internal spaces from the engine B to the intake pipe D through which the blow-by gas returns, and if the amount of change in pressure in the closed space detected by the pressure sensor A12 exceeds the threshold value, the control unit A13 diagnoses an abnormality.

As a result, in the case where an unacceptable amount of blow-by gas leaks in the return flow paths C1 and C2 and the amount of change in pressure in the closed space exceeds the threshold value, it is possible to diagnose an abnormality. By using the solenoid valve 1 of the present embodiment, which has little gas leakage, as the solenoid valves A11 of the abnormality diagnosis apparatus A1, it is possible to improve the abnormality diagnosis accuracy. Because the solenoid valve 1 is compact, the structure of the abnormality diagnosis device A1 can also be reduced in size. In addition, because the solenoid valve 1 is of the normally open type that is closed only when energized, it is sufficient to energize the solenoid valve only at the time of diagnosis and a low cost can be realized.

Second Embodiment

Figure 9:
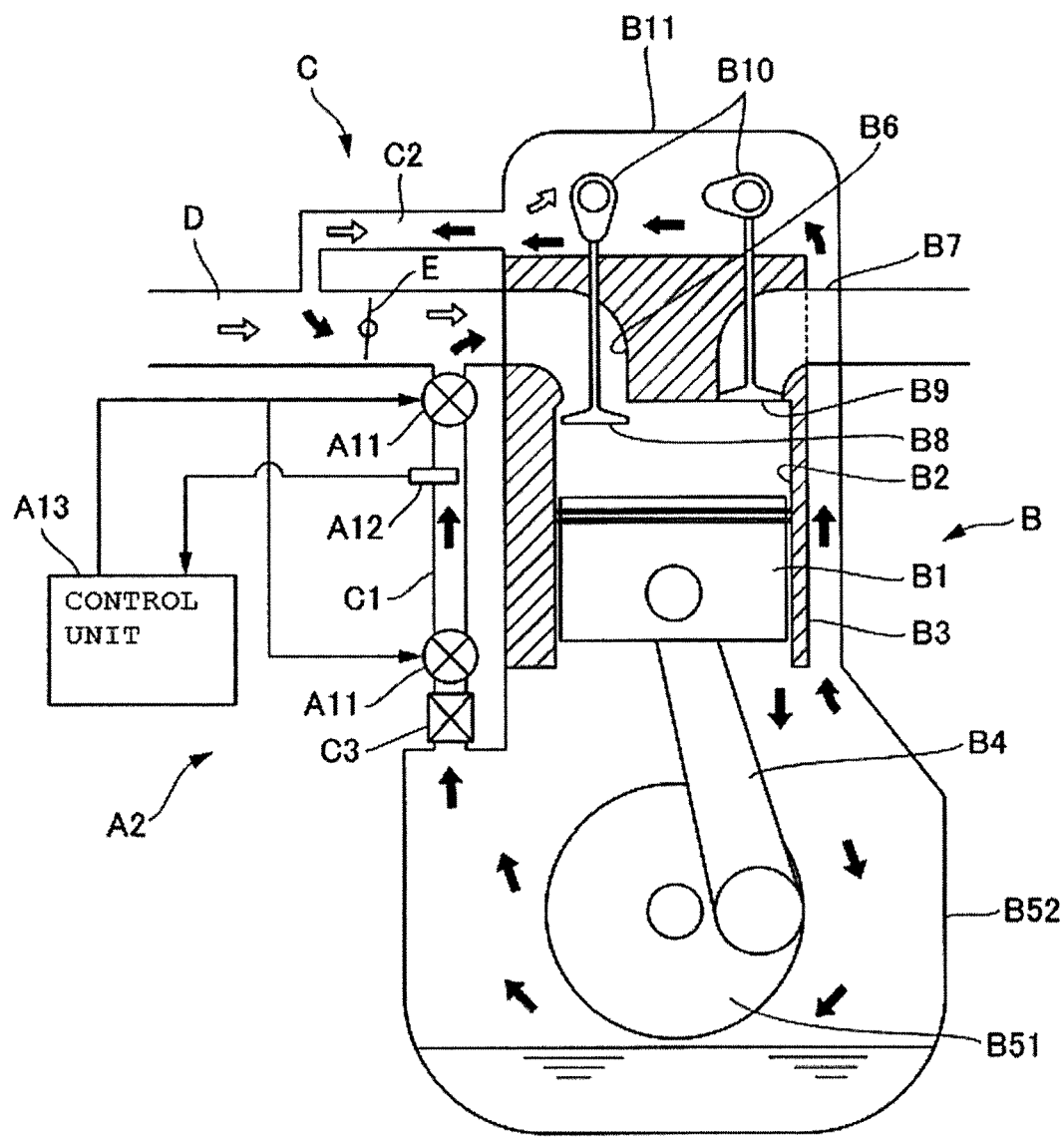
FIG. 9 is a diagram illustrating a configuration of an abnormality diagnosis apparatus of a second embodiment.

FIG. 9 is a diagram illustrating a configuration of an abnormality diagnosis apparatus A2 according to a second embodiment.

As illustrated in FIG. 9, the abnormality diagnosis device A2 of the second embodiment has the same configuration and processing procedure as the abnormality diagnosis apparatus A1 of the first embodiment except that the two solenoid valves A11 are provided at both ends of the return flow path C1. One of the solenoid valves A11 opens and closes the flow path of the blow-by gas from the crankcase B52 to the recirculation path C1, with the crankcase B52 serving as an in-port and the return flow path C1 serving as an out-port. The other of the solenoid valves A11 opens and closes the flow path from the return flow path C1 to the intake pipe D, with the return flow path C1 serving as an in-port and the intake pipe D serving as an out-port.

In the abnormality diagnosis apparatus A2, the closed space when the two solenoid valves A11 are closed is the internal space of the return flow path C1. That is, in the abnormality diagnosis device A2, it is possible to detect leakage of the blow-by gas due to breakage or pipe disengagement of the return flow path C1 with the return flow path C1 serving as the target of abnormality diagnosis. The effect of using the solenoid valve 1 as the solenoid valves A11 of the abnormality diagnosis device A2 is the same as in the first embodiment.

In this way, by arranging the two solenoid valves A11 in either or both of the return flow paths C1 and C2 of the blow-by gas, it is possible to arbitrarily form a closed space to be a target of blow-by gas abnormality diagnosis.

Features of the above-described preferred embodiments and the modifications thereof may be combined appropriately as long as no conflict arises.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A solenoid valve comprising:
   a solenoid portion that includes a pin that is movable in an axial direction and that moves the pin to one side in the axial direction by an attractive force generated by excitation, and
   a nozzle portion positioned on one side of the solenoid portion in the axial direction and having a valve body connected to one side of the pin in the axial direction,
   wherein the nozzle portion includes
   a nozzle body that includes a valve chamber, which is recessed toward one side of the nozzle body in the axial direction and opens on the other side of the nozzle body in the axial direction, and that houses the valve body in the valve chamber,
   a first port provided in the nozzle body and that communicates with a bottom surface of the valve chamber on one side of the valve chamber in the axial direction,
   a second port that is provided in the nozzle body and that communicates with an inner surface of the valve chamber in a radial direction, a valve hole that is provided in the bottom surface of the valve chamber and that communicates with the first port, and a spring that is housed in the valve chamber and that urges the valve body toward the other side in the axial direction, wherein, when the solenoid portion is excited, the valve body is driven by the pin, moves to the one side in the axial direction, and closes the valve hole, and when the solenoid portion is not excited, the valve body is urged by the spring, moves to the other side in the axial direction, and opens the valve hole, wherein the valve body includes a first valve body portion and a second valve body portion connected to each other in the axial direction, wherein the first valve body portion is positioned on the other side of the second valve body portion in the axial direction and contacts the inner surface of the valve chamber in the radial direction, wherein the second valve body portion has a smaller diameter than the first valve body portion, and wherein the spring is disposed in an annular space portion between an outer surface of the second valve body portion in the radial direction and the inner surface of the valve chamber in the radial direction, one side of the spring in the axial direction is in contact with the bottom surface of the valve chamber, the other side of the spring in the axial direction is in contact with the first valve body portion extending in the radial direction from the outer surface of the second valve body portion, and the spring urges the valve body toward the other side in the axial direction;

wherein the nozzle body includes a guide that guides the valve body on the inner surface of the valve chamber, and when the valve hole is opened and closed, the first valve body portion of the valve body moves within a range of the guide along an inner surface of the guide wherein the solenoid portion includes a bobbin having a cylindrical shape, the bobbin extending along the axial direction and including a first through hole along the axial direction;

a coil wounded around a circumferential surface of the bobbin, a yoke disposed on the other side of the bobbin in the axial direction, a plunger disposed on the other side of the first through hole in the axial direction and fixed to the other side of the pin in the axial direction, a core having a cylindrical shape, the core being disposed on one side of the first through hole in the axial direction and including a second through hole along the axial direction; and a seal member provided between the bobbin and the yoke.

2. The solenoid valve according to claim 1, wherein an inner diameter of the spring is larger than an outer diameter of the second valve body portion and smaller than an outer diameter of the spring, wherein the outer diameter of the spring is smaller than an outer diameter of the first valve body portion, wherein a difference between the outer diameter of the first valve body portion and the outer diameter of the second valve body portion is greater than twice a cross-sectional diameter of the spring, and wherein a difference between the outer diameter of the first valve body portion and the outer diameter of the spring is larger than a difference between the inner diameter of the spring and the outer diameter of the second valve body portion.

3. The solenoid valve according to claim 1, wherein an inner diameter of the spring is larger than an outer diameter of the second valve body portion and smaller than an outer diameter of the spring, wherein the outer diameter of the spring is smaller than an outer diameter of the first valve body portion, wherein a difference between the outer diameter of the first valve body portion and the outer diameter of the second valve body portion is greater than twice a cross-sectional diameter of the spring, and wherein a difference between the outer diameter of the first valve body portion and the outer diameter of the spring is larger than a difference between the inner diameter of the spring and the outer diameter of the second valve body portion.

4. The solenoid valve according to claim 1, wherein the second valve body portion has a smaller diameter on the one side in the axial direction than on the other side.

5. The solenoid valve according to claim 1, wherein the second valve body portion includes an elastic body portion on an end surface on one side of the second valve body portion in the axial direction, and when the valve hole is closed, the elastic body portion comes into contact with the valve hole, and when the valve hole is opened, the elastic body portion becomes separated from the valve hole.

6. The solenoid valve according to claim 5, wherein the valve hole has a peripheral edge portion that protrudes in a cylindrical shape on the other side in the axial direction and the peripheral edge portion comes into contact with the elastic body portion of the second valve body portion when the valve hole is closed.

7. The solenoid valve according to claim 1, wherein the solenoid portion includes a solenoid housing portion having a cylindrical shape, wherein the solenoid housing portion includes an opening portion on the one side of the solenoid portion in the axial direction and housing the solenoid portion, and wherein the solenoid housing portion includes a crimp portion at a peripheral edge of the opening portion, wherein the crimp portion contacts an outer periphery of the nozzle body, and the solenoid housing portion is fixed to the nozzle body.

8. The solenoid valve according to claim 7, wherein the nozzle body includes a groove along a circumferential surface of the nozzle body on the other side of the nozzle body in the axial direction, and the crimp portion of the solenoid housing portion is brought into contact with the groove.

9. The solenoid valve according to claim 1, wherein a seal member is provided between the solenoid portion and the nozzle portion.

10. The solenoid valve according to claim 1, wherein the core having a cylindrical shape includes a flange portion extending in the radial direction on one side of the core in the axial direction, wherein the bobbin is disposed between the flange portion of the core and the yoke, and wherein the solenoid portion includes a seal member between the flange portion of the core and the bobbin.

11. The solenoid valve according to claim 1, wherein the solenoid portion includes a bearing portion that supports the pin in the second through hole of the core, and the pin is housed in the second through hole and supported by the bearing portion.

* * * * *